June 14, 1949.　　　　　M. ESSL　　　　　2,473,417
SECTIONAL SHAFT
Filed May 24, 1944
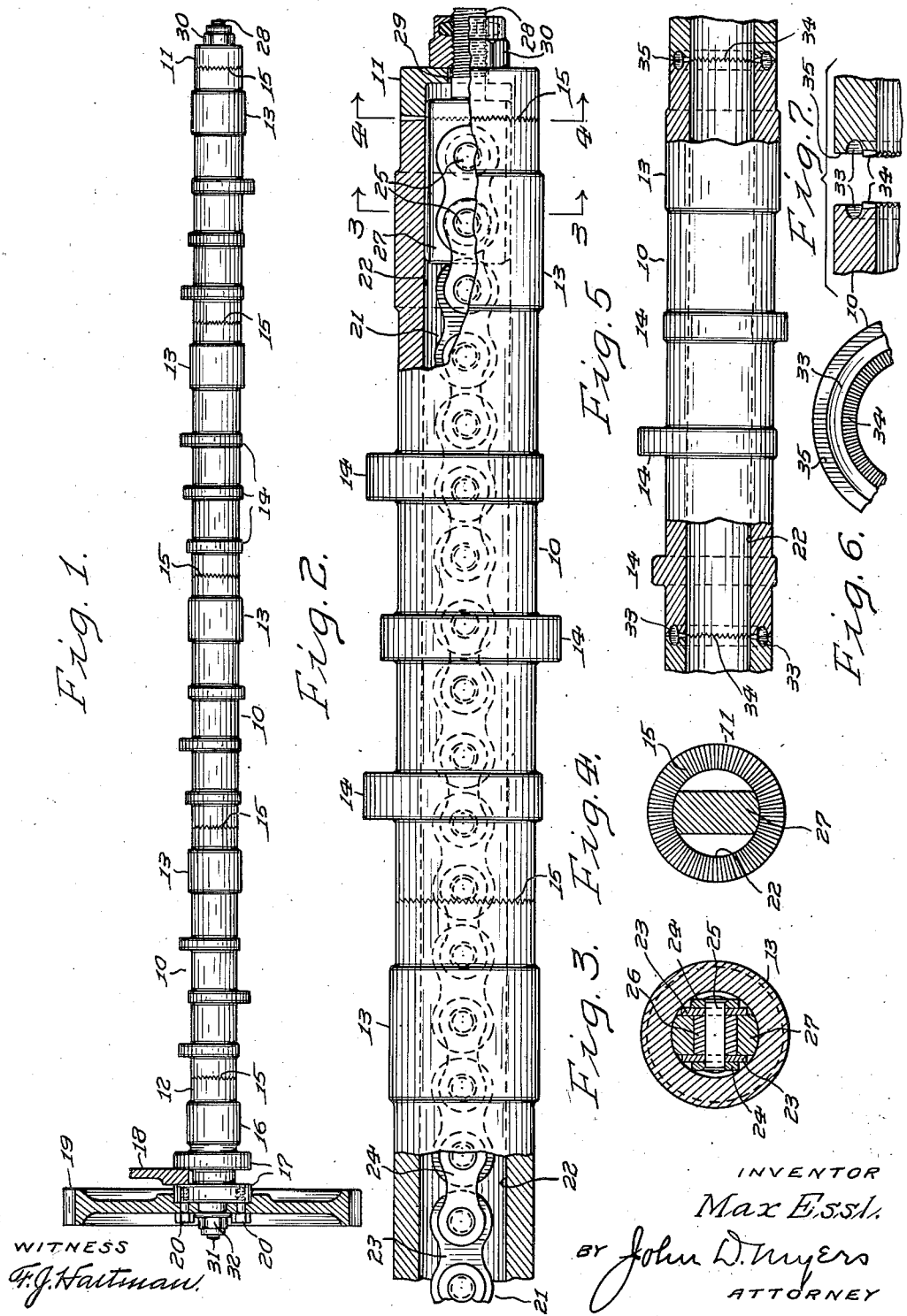
INVENTOR
Max Essl.
BY John D. Myers
ATTORNEY Patented June 14, 1949

2,473,417

UNITED STATES PATENT OFFICE 2,473,417

SECTIONAL SHAFT

Max Essl, Swarthmore, Pa., assignor to William H. Harman Corporation, Wilmington, Del., a corporation of Delaware Application May 24, 1944, Serial No. 537,156

7 Claims. (Cl. 74—568)

1

The invention relates to a sectional shaft and is directed particularly to an improved cam shaft for use in internal combustion engines and to the manufacture of the same.

In the construction of internal combustion engines it is common to completely enclose the cam shaft within the engine block or casting, and it has been found desirable to design the engines in such a manner that the cam shaft may be removed and replaced with a minimum of disturbance of the other parts of the engine. In large modern engines, particularly those of the Diesel type, the cam shafts are sometimes of such a length that insufficient space is available to permit endwise movement thereof for removal or replacement. It has also been recognized that the arrangement of the cam shaft and the manner of supporting it should be such that the engine structure is not undesirably weakened where provision is made for the removal of the shaft transversely through openings in the side of the engine.

In order to meet these requirements attempts have heretofore been made to provide a sectional cam shaft so designed that the individual units may be removed transversely from the engine through comparatively small openings. So far as I am aware, however, these attempts have been confined to sectional shafts the units of which are provided with coupling flanges which are bolted together when the shaft is assembled, or to sectional shafts the units of which are provided on their ends with external and internal gear teeth such as utilized with the cam shaft disclosed in Patent No. 2,323,209, granted June 29, 1943, on an application filed by me.

Sectional cam shafts of the type wherein the separate units are connected together by means of coupling flanges and bolts are not only expensive to manufacture, but the coupling elements require an undue amount of space both transversely and lengthwise of the shafts, and the location of the bolts is such that they are not readily accessible in assembling and dismantling the shafts. Sectional cam shafts which utilize coupling and driving members in the form of internal and external gear teeth are also expensive to manufacture, the coupling elements take up an undue amount of space longitudinally of the shaft, and such a shaft requires a thrust bearing for each shaft section when the shaft is assembled in the engine.

One of the principal objects of the present improvement is the provision of a cam shaft or the like which consists of standardized or identical units which may be assembled end to end in order to form a shaft of any desired length as well as a shaft having individual units which may be removed or replaced transversely of the shaft with a minimum of disturbance of the other elements of the shaft and the parts associated therewith.

2

Another object of the invention is the provision of a cam shaft or the like which consists solely of a tie member and separate integral units each of which may be adjusted independently about the axis of the shaft in order to adapt the separate units as well as the entire shaft to any cylinder and crank arrangement and firing order of the engine. A still further object of the invention is the provision, in a cam shaft, of individual sections, one for each cylinder of the engine, so designed that they may be uncoupled or dismantled with a minimum of longitudinal movement, and so that an individual section may be readily removed or replaced from the side of the engine, through a comparatively small opening. Another object of the invention is the provision, in a sectional cam shaft or the like, of coupling means which is comparatively inexpensive to manufacture and requires substantially no space transversely or longitudinally of the shaft. A still further object of the invention is the provision, in a cam shaft or the like, of coupling means which serves to center and align the sections of the shaft accurately with respect to each other and provide a simple driving connection between the sections. It is also an object of the invention to provide for a sectional cam shaft or the like a jointed or flexible tie member or retaining means which extends through the shaft sections for holding them together, and which is so constructed that it may be easily removed endwise from the shaft or engine through a space which is so restricted as to prevent the removal and replacement of a rigid tie rod. Still other objects and advantages of the improvement will be apparent from the following description, taken with the accompanying drawing, wherein:

Fig. 1 is a side elevational view of a sectional cam shaft having one form of the present improvement incorporated therein;

Fig. 2 is an enlarged view of the right hand end of the cam shaft shown in Fig. 1, with parts cut away to show details of construction;

Fig. 3 is a transverse sectional view taken on the line 3—3 of Fig. 2;

Fig. 4 is a transverse sectional view taken on the line 4—4 of Fig. 2 and showing the arrangement of the radial serrations which join the shaft sections together;

Fig. 5 is a side elevational view of a portion of a cam shaft provided with a slightly modified form of coupling means, parts being in section to show details of construction;

Fig. 6 is an end elevational view of a portion of one of the cam shaft sections shown in Fig 5; and Fig. 7 is a detailed sectional view of the modified form of coupling means shown in Figs. 5 and 6.

While the present improvement may be utilized with shafts of other types, it is illustrated in the drawing in connection with a cam shaft comprising a plurality of identical, elongated sections 10 which may be of hollow cylindrical form, a hollow end cap or thrust member 11 on one end thereof and a hollow driving section 12 on the opposite end. Each of the identical sections 10 is provided with a bearing surface 13 by means of which it is rotatably supported on some suitable part of the engine, and with a plurality of cams 14 for actuating various moving parts of the engine, such as a fuel pump and intake and exhaust valves, in a manner well understood.

The end of each of the identical sections is provided with a plurality of radial serrations 15 which interfit with similar radial serrations on the ends of adjoining sections in order to properly center the sections with respect to each other and provide a driving connection between the sections when the shaft is assembled. The end cap 11 and the driving section 12 are also provided with radial serrations to interfit with the serrations on the ends of the identical sections adjacent thereto. The driving section 12 may be provided with a bearing surface 16 for rotatably supporting this section on a suitable part of the engine, and this section is preferably provided with a pair of spaced ruffs 17 between which a fixed thrust element 18 is received to prevent endwise movement of the shaft when assembled in the engine. Rotary motion may be given to the shaft through a gear 19 secured to the outer ruff 17 by means of bolts 20 and driven in any suitable manner in timed relation to the crank shaft of the engine.

The various sections of the shaft are held together rigidly by means of a jointed or flexible tie member 21 extending throughout the length of the shaft in the opening 22 formed by the aligned bores of the individual sections. While other forms of tie member may be employed, such as a jointed rod or a flexible cable, as illustrated in the drawing, the tie member is in the form of a roller chain made up of inner links 23, outer links 24, and pins 25 connecting the overlapping portions of the inner and outer links. The links on the opposite sides of the chain are spaced from each other on the pins 25 by suitable rollers or spacing sleeves 26. The transverse dimensions of the chain are preferably such that the links contact with the surface of the bore of the shaft sections as shown in Fig. 3 in order to prevent transverse vibrational movement of the tie member.

Each end of the chain is preferably secured to a block 27 which fits within the bore of the shaft in the manner illustrated in Figs. 2, 3 and 4. The block 27 shown in Fig. 2 is provided with a reduced threaded extension 28 projecting outwardly through a central opening 29 in the end cap 11 to receive a lock nut 30 thereon. The nut 30 engages with end cap 10 when the parts of the shaft are assembled. The reduced extension 31 on the opposite end of the chain projects outwardly through the driving gear 19 and is likewise provided with a threaded lock nut 32 which engages with the gear 19 in order to apply pressure to the driving section or end thrust member 12 and thereby clamp the sections of the shaft rigidly together when the nuts 30 and 32 are tightened.

The various sections of the shaft are preferably made from forged stock. In their manufacture the forgings are rough bored to provide a central opening therethrough, after which the cams and bearings may be rough ground or machined. The bore may then be finished and the ends of the sections provided with finished surfaces perpendicular to the axis of the bore. The sections are then suitably centered in a heavy press and the radial serrations 15 are impressed on the end surfaces. The sections are then centered on the serrated ends during the operation of finish grinding the cams and bearings.

When the shaft sections are made in this manner, the radial serrations 15 serve to center the sections accurately and align them properly with respect to one another when they are assembled in the shaft and the nuts 30 and 32 on the opposite ends of the tie member 21 are tightened to the desired extent against the end thrust members 11 and 12. The radial serrations also serve to provide the necessary driving connection between the sections of the shaft without taking up any space longitudinally of the shaft and without extending transversely beyond the periphery of the shaft proper.

In the operation of impressing the radial serrations in the ends of the shaft sections it may be desirable, under certain conditions, to provide some means whereby the flow of the metal transversely of the sections may be facilitated. A simple means for accomplishing this is illustrated in Figs. 5, 6 and 7, and involves the provision of an annular groove 33 in each end of the sections. In this case the radial serrations 34 are impressed only on the portion of the end surface inwardly of the groove 33, the surface 35 outwardly of the groove being left free of serrations so that it may abut against the corresponding surface on the end of an adjacent section. In this manner it is sometimes possible to secure a more accurate alignment of the shaft sections than could be obtained where the serrations extend entirely across the end surface of the shaft sections. It will be understood, of course, that the procedure followed in making a shaft section having this modified form of coupling means will be substantially the same as that described above except for the additional operation which is required in providing the annular groove 33 in the ends of the shaft sections.

From the above description of the improvement it will be apparent that the separate sections of the cam shaft may be readily inserted through suitable openings in the side of the engine and positioned in their respective bearings with the radial serrations on the ends of the sections interfitting with the serrations on the ends of adjacent sections. It will also be apparent that each of the separate sections may be suitably adjusted about the axis of the shaft independently of the other sections in order to provide the desired timing arrangement of the cams. When the sections are thus assembled in end to end relation in the engine, the flexible tie member may be inserted through the assembled sections from the end of the engine. Due to the flexibility or jointed construction of the tie member, it may be readily inserted or removed from the end of the engine notwithstanding the lack of sufficient space to permit the insertion and removal of a rigid shaft or tie rod.

Adjustment of the cams may be easily effected at any time by merely loosening the clamping nuts on the ends of the tie member sufficiently to permit disengagement of the serrations on the ends of the section to be adjusted so that it may be moved angularly into the position desired. The clamping nuts may then be tightened to clamp the sections of the shaft together and restore its rigidity. The size of the teeth on the ends of the sections should be such as to provide the range and degree of adjustment desired. While the forms of the improvement illustrated in the drawing show serrations extending entirely around the end of the sections, it will be understood that the arrangement of the serrations may be discontinuous, that is, they may be arranged in suitable groups so long as they perform the intended function. It will also be apparent that the use of identical sections makes it possible to build up a shaft of any length for use in engines having any number of cylinders.

While a preferred form of the improvement has been disclosed, together with a modification of the coupling means, it is to be understood that the invention is not limited to the precise structure or manufacturing procedure disclosed herein. For example, the number of cams and bearings on each shaft section may be varied as desired, and the sections may be of any suitable formation other than cylindrical. Also other forms of tie member may be used so long as they are capable of being bent laterally for insertion into and removal from the shaft sections, or are formed of jointed sections capable of being readily assembled and disassembled. The above description and the accompanying drawings are therefore to be regarded as illustrative only, and it is to be understood that the invention is susceptible of other forms and arrangements so long as they come within the scope of the appended claims.

What I desire to claim is:

1. A power transmitting shaft comprising a plurality of hollow sections arranged in end to end relation and having motion transmitting elements thereon, cooperating means on the adjacent ends of adjoining sections for centering and aligning the sections with respect to each other and providing an adjustable driving connection between the sections, a flexible tie member extending through said sections, and means on said tie member for clamping said sections rigidly together.

2. A cam shaft comprising a plurality of hollow sections arranged in end to end relation and having cam elements thereon, cooperating means on the adjacent ends of adjoining sections for centering and aligning the sections with respect to each other and providing an adjustable driving connection between the sections, a flexible tie member extending through said sections, and means on said tie member for clamping said sections rigidly together.

3. A cam shaft comprising a plurality of hollow sections arranged in end to end relation and having cam elements thereon, a plurality of serrations extending radially on the ends of each section and arranged to interfit with the serrations of an adjoining section to provide centering and aligning means and an adjustable driving connection between said sections, a flexible tie member extending through said sections, and means on the ends of said tie member for clamping said sections rigidly together.

4. A cam shaft comprising a plurality of hollow cylindrical sections having a bearing member and a plurality of cam elements on each, a plurality of serrations extending radially on the ends of each section and arranged to interfit with the serrations of an adjoining section to provide centering and aligning means and an adjustable driving connection between said sections, a tie member extending through said sections, and means on said tie member for clamping said sections rigidly together.

5. A cam shaft comprising a plurality of hollow cylindrical sections having a bearing member and a plurality of cam elements on each, a plurality of serrations extending radially on the ends of each section and arranged to interfit with the serrations of an adjoining section to provide aligning means and an adjustable driving connection between said sections, a thrust member on the outer end of each end section and having radial serrations thereon interfitting with the serrations on the end sections, a jointed tie member extending through said sections and said thrust members, means on said tie member for applying pressure to said thrust members to clamp said sections rigidly together, and means on one of said thrust members for rotating said shaft.

6. A sectional shaft comprising a plurality of hollow sections arranged in end to end relation, a plurality of serrations extending radially on the ends of each section and arranged to interfit with the serrations of an adjoining section to provide centering and aligning means and an adjustable driving connection between said sections, a flexible tie member extending through said sections, and means on the ends of said tie member for clamping said sections rigidly together.

7. A sectional shaft comprising a plurality of hollow sections arranged in end to end relation, a plurality of serrations extending radially on the ends of each section and arranged to interfit with the serrations of an adjoining section to provide centering and aligning means and an adjustable driving connection between said sections, a thrust member on the outer end of each end section and having radial serrations thereon interfitting with the serrations on the end sections, a flexible tie member extending through said sections and said thrust members, and means on said tie member for applying pressure to said thrust members to clamp said sections rigidly together.

MAX ESSL.

REFERENCES CITED

The following references are of record in the file of this patent:

UNITED STATES PATENTS

| Number | Name | Date |
|---|---|---|
| 851,118 | Chadwich | Apr. 23, 1907 |
| 933,285 | Blair | Sept. 7, 1909 |
| 1,483,499 | Allee | Feb. 12, 1924 |
| 1,580,178 | Talbot | Apr. 13, 1926 |
| 1,977,194 | Malkovsky | Oct. 16, 1934 |
| 2,202,330 | Brock et al. | May 28, 1940 |
| 2,291,709 | Goetze | Aug. 4, 1942 |
| 2,402,868 | Boyle | June 25, 1946 |

FOREIGN PATENTS

| Number | Country | Date |
|---|---|---|
| 91,944 | Germany | June 25, 1898 |
| 78,575 | Switzerland | Aug. 1, 1918 |